(12) United States Patent
Hao

(10) Patent No.: US 10,146,983 B2
(45) Date of Patent: Dec. 4, 2018

(54) FINGERPRINT DECRYPTION METHOD AND DEVICE

(71) Applicant: SHENZHEN GOODIX TECHNOLOGY CO., LTD., Shenzhen, Guangdong (CN)

(72) Inventor: Qiyi Hao, Guangdong (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/383,036

(22) Filed: Dec. 19, 2016

(65) Prior Publication Data

US 2017/0103250 A1    Apr. 13, 2017

Related U.S. Application Data

(63) Continuation of application No. PCT/CN2014/096070, filed on Dec. 31, 2014.

(30) Foreign Application Priority Data

Oct. 20, 2014    (CN) .......................... 2014 1 0559722

(51) Int. Cl.
  G06K 9/00    (2006.01)
  H04L 9/32    (2006.01)
  (Continued)

(52) U.S. Cl.
  CPC ..... *G06K 9/00013* (2013.01); *G06K 9/00087* (2013.01); *G06K 9/68* (2013.01);
  (Continued)

(58) Field of Classification Search
  CPC combination set(s) only.
  See application file for complete search history.

(56) References Cited

U.S. PATENT DOCUMENTS 5,933,515 A    8/1999 Pu et al.
  2004/0064415 A1*  4/2004 Abdallah ............. G06Q 50/265
                                                                 705/50
  (Continued)

FOREIGN PATENT DOCUMENTS

CN    101340285 A    1/2009
  CN    102279923 A    12/2011
  CN    103294963 A    9/2013

OTHER PUBLICATIONS

State Intellectual Property Office of the P.R. China (ISR/CN), "International Search Report for PCT/CN2014/096070", China, dated Jul. 17, 2015.
(Continued)

*Primary Examiner* — Tsung-Yin Tsai
(74) *Attorney, Agent, or Firm* — Tim Tingkang Xia, Esq.; Locke Lord LLP

(57) ABSTRACT

The present disclosure is applicable to the technical field of fingerprint identification, and provides a fingerprint decryption method and device. The method includes the following steps: receiving N input fingerprints, N being an integer greater than or equal to 2; and decrypting a to-be-decrypted object according to the N input fingerprints, the to-be-decrypted object being encrypted by using N preset fingerprints. According to the present disclosure, the to-be-decrypted object is decrypted by using an input fingerprint combination of two or more fingerprints, which improves data security of the mobile terminal.

8 Claims, 2 Drawing Sheets

(51) Int. Cl.
*G06K 9/68* (2006.01)
*H04L 9/08* (2006.01)
*H04L 9/14* (2006.01)

(52) U.S. Cl.
CPC .............. *H04L 9/0866* (2013.01); *H04L 9/14* (2013.01); *H04L 9/3231* (2013.01)

(56) References Cited

U.S. PATENT DOCUMENTS

| | | | | |
|---|---|---|---|---|
| 2008/0008359 | A1* | 1/2008 | Beenau | G01D 21/00 |
| | | | | 382/117 |
| 2008/0021840 | A1* | 1/2008 | Beenau | G06Q 20/382 |
| | | | | 705/64 |
| 2010/0138667 | A1* | 6/2010 | Adams | G06F 21/32 |
| | | | | 713/186 |
| 2010/0246902 | A1* | 9/2010 | Rowe | G06K 9/00033 |
| | | | | 382/115 |
| 2013/0129161 | A1 | 5/2013 | Goel | |
| 2014/0003681 | A1 | 1/2014 | Wright et al. | |
| 2014/0189604 | A1* | 7/2014 | Garrison | G06F 3/0488 |
| | | | | 715/863 |
| 2015/0082421 | A1* | 3/2015 | Flowers | G06F 21/00 |
| | | | | 726/16 |
| 2015/0135108 | A1* | 5/2015 | Pope | G06K 9/00006 |
| | | | | 715/767 |

OTHER PUBLICATIONS

European Patent Office, "Extended European Search Report for EP Application No. 14904349.9", The Hague, dated Apr. 24, 2018.

* cited by examiner

FINGERPRINT DECRYPTION METHOD AND DEVICE

CROSS-REFERENCE TO RELATED APPLICATIONS

The present application is a continuation of international application No. PCT/CN2014/096070, filed on Dec. 31, 2014, which claims priority to Chinese Patent Application No. CN2014105597220, filed on Oct. 20, 2014, both of which are hereby incorporated by reference in its entireties.

TECHNICAL FIELD

The present disclosure pertains to the technical field of fingerprint identification, and in particular, relates to a fingerprint decryption method and device.

BACKGROUND

In recent years, with the abundance of applications applicable to mobile terminals such as smart phones and the like, the mobile terminals provides more and more financial functions, for example, mobile payment, mobile wallet and the like. Since a mobile terminal stores a lot of private information and important data, a higher security requirement is imposed on the mobile terminal.

At present, the data of a mobile terminal is generally encrypted by inputting a graphic password or a text password via a keyboard of the mobile terminal. This encryption method fails to authenticate the identity of a user. When the user uses the mobile terminal in public places, the password may be simply leaked, thereby causing threaten to the security.

SUMMARY

An embodiment of the present disclosure provides a fingerprint decryption method. The method includes the following steps:

receiving N input fingerprints, N being an integer greater than or equal to 2; and decrypting a to-be-decrypted object according to the N input fingerprints, the to-be-decrypted object being encrypted by using N preset fingerprints.

Preferably, the N input fingerprints are different from each other or partially same, and the N preset fingerprints are different from each other or partially same.

Preferably, a total input time duration of the N input fingerprints is less than or equal to a first predetermined threshold.

Preferably, an input time interval of the received N fingerprints is less than or equal to a second predetermined threshold.

Preferably, the decrypting a to-be-decrypted object according to the N input fingerprints comprises:

comparing the N input fingerprints with the N preset fingerprints; and decrypting the to-be-decrypted object when the N input fingerprints respectively match with the N preset fingerprints.

Preferably, the comparing the N input fingerprints with the N preset fingerprints comprises:

successively comparing the N input fingerprints with the N preset fingerprints in a one-by-one manner; and wherein the N input fingerprints respectively matching with the N input fingerprints specifically refers to:

the N input fingerprints respectively match with the N preset fingerprints and an input sequence of the N input fingerprints is also in accordance with a specific sequence of the N preset fingerprints.

The present disclosure further provides a fingerprint decryption device. The device includes:

a receiving module, configured to receive N input fingerprints, N being an integer greater than or equal to 2; and a decrypting module, configured to decrypt a to-be-decrypted object according to the N input fingerprints, the to-be-decrypted object being encrypted by using N preset fingerprints.

Preferably, the N input fingerprints are different from each other or partially same, and the N preset fingerprints are different from each other or partially same.

Preferably, a total input time duration of the N input fingerprints is less than or equal to a first predetermined threshold.

Preferably, an input time interval of the received N fingerprints is less than or equal to a second predetermined threshold.

Preferably, the decrypting module comprises:

a comparing unit, configured to compare the N input fingerprints with the N preset fingerprints; and a decrypting unit, configured to decrypt the to-be-decrypted object when the N input fingerprints respectively match with the N preset fingerprints.

Preferably, the comparing unit is specifically configured to successively compare the N input fingerprints with the N preset fingerprints in a one-by-one manner; and wherein the N input fingerprints respectively matching with the N preset fingerprints specifically refers to:

the N input fingerprints respectively match with the N preset fingerprints and an input sequence of the N input fingerprints is also in accordance with a specific sequence of the N preset fingerprints.

DETAILED DESCRIPTION

In order to make the objectives, technical solutions, and advantages of the present disclosure clearer, the present disclosure is further described in detail below by reference to the embodiments and the accompanying drawings. It should be understood that the embodiments described here are only exemplary ones for illustrating the present disclosure, and are not intended to limit the present disclosure.

Embodiment 1

Figure 1:
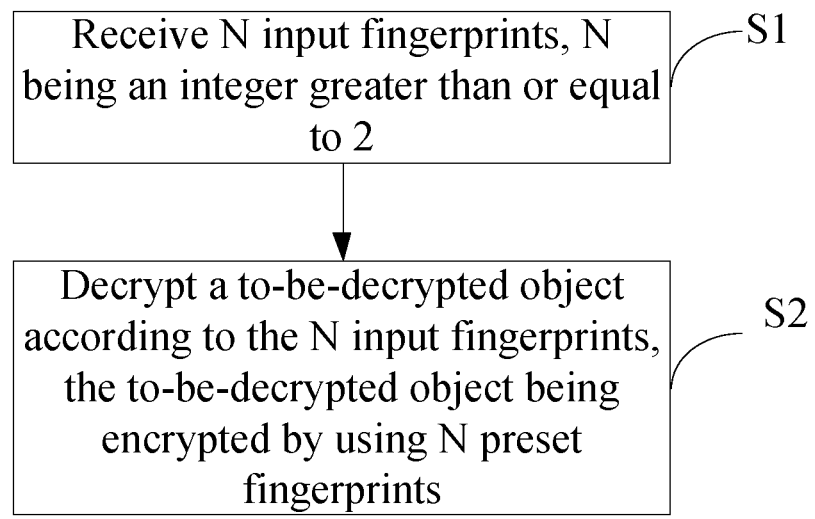
FIG. 1 is a flowchart of a fingerprint decryption method according to a first embodiment of the present disclosure.

This embodiment of the present disclosure provides a fingerprint decryption method. As illustrated in FIG. 1, the method includes the following steps:

S1: N input fingerprints are received, wherein N is an integer greater than or equal to 2.

In this embodiment, a to-be-decrypted object is decrypted by using a fingerprint combination, wherein the fingerprint combination includes two or more input fingerprints; the fingerprint combination may additionally include other non-fingerprint decryption information, such as digits, letters and the like.

S2: A to-be-decrypted object is decrypted according to the N input fingerprints as received, wherein the to-be-decrypted object is encrypted by using N preset fingerprints.

In this embodiment, N preset fingerprints are used to encrypt an object to obtain the to-be-decrypted object, and the to-be-decrypted object is stored. This embodiment of the present disclosure may be applicable to any scenario where encryption and decryption are needed, for example, unlocking of a mobile terminal, account login and payment, and switching of a working mode, an operating system, a wallpaper, a subject and the like of the mobile terminal. The to-be-decrypted object includes, but not limited to, a document, a file folder and an application.

Correspondingly, N input fingerprints are received when decryption is needed. The N input fingerprints may be different from each other, or partially or totally the same. Likewise, the N preset fingerprints may be different from each other, or partially or totally the same. For example, a fingerprint of a little finger of a right hand is input twice to the fingerprint sensor (N=2) to form two preset fingerprints, or a fingerprint of a thumb of a left hand and a fingerprint of a forefinger of the right hand may be input to form two preset fingerprints, or even fingerprints of two persons may be input to form two preset fingerprints. When the N preset fingerprints are different from each other, the to-be-decrypted object using the N preset fingerprints for encryption has a highest security level.

Further, a total input time duration and/or an input time interval of N fingerprints may be preset.

The total input time duration of the N fingerprints is set to be less than or equal to a first predetermined threshold. When a total input time duration of the input fingerprint combination, i.e., the N input fingerprints, is greater than the first predetermined threshold, it is determined that the input fingerprints do not belong to a single fingerprint input process (if the total input time duration exceeds 10 seconds, it is considered that a fingerprint input after the 10 seconds does not pertain to the input fingerprints for this decryption).

The input time interval of the N fingerprints is set to be less than or equal to a second predetermined threshold. When a time interval between two successive input fingerprints is greater than the second predetermined threshold, it is determined that the N input fingerprints do not belong to a single fingerprint input process, or it is determined that the input fingerprint combination for decryption is different from a preset fingerprint combination for encryption.

In this embodiment of the present disclosure, the input fingerprints for decryption are compared with the preset fingerprints for encryption, and a matching standard between the input fingerprints for decryption and the preset fingerprints for encryption may be predefined. On the basis that the number of input fingerprints as received is the same as the number of the preset fingerprints, fingerprint matching is performed, wherein the fingerprint matching may employ a known algorithm, which is not described herein any further. The to-be-decrypted object is decrypted when the input N fingerprints as received respectively match with the N preset fingerprints.

In this embodiment of the present disclosure, when the N input fingerprints all successfully match (when other encryption information is included, the encryption information also needs to be compared), it is determined that the input fingerprint combination for decryption is consistent with the preset fingerprint combination for encryption. If the N preset fingerprints are partially or totally the same, the number of same fingerprints may be set, instead of setting the same fingerprints repeatedly.

Further, an input sequence of fingerprints may be defined corresponding to the N preset fingerprints. During decryption, the N input fingerprints as received are successively compared with N preset fingerprints in a one-by-one manner; and the to-be-decrypted object is decrypted when the N input fingerprints as received respectively match with the N preset fingerprints in fingerprint characteristics and an input sequence of the N input fingerprints is also in accordance with a specific sequence of the N preset fingerprints. If the input sequence of fingerprints is strictly defined, with respect to the input fingerprint combination in which the N input fingerprints all successfully match with the N preset fingerprints, but with different input sequences, it is still determined that the input fingerprint combination is inconsistent with the preset fingerprint combination.

In this embodiment of the present disclosure, the to-be-decrypted object is decrypted by using an input fingerprint combination of two or more fingerprints, which improves the security of data or applications of the mobile terminal. In addition, due to uniqueness of the fingerprint, the user does not need to worry about interception or peeping by others during fingerprint input, and thus great convenience is brought to the user. Furthermore, the total input time duration, the input time interval and the input sequence of the fingerprint combination may be defined to further improve data security.

This embodiment may be applicable to all mobile terminals equipped with a fingerprint sensor. Since the tablet computers, smart phones and the like mobile terminals available in the market are all provided with a fingerprint sensor, fingerprint decryption may be practiced without increasing any cost for additional device.

Embodiment 2

Figure 2:
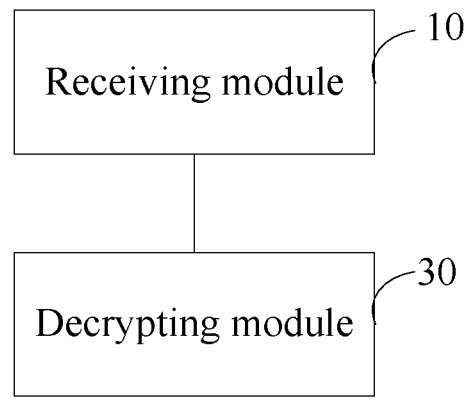
FIG. 2 is a structural diagram of a fingerprint decryption device according to a second embodiment of the present disclosure.

This embodiment of the present disclosure provides a fingerprint decryption device. The device may be a mobile terminal, or may be a device built in the mobile terminal or externally connected to the mobile terminal. As illustrated in FIG. 2, the fingerprint decryption device includes:

a receiving module 10, configured to receive N input fingerprints, N being an integer greater than or equal to 2; and a decrypting module 30, configured to decrypt a to-be-decrypted object according to the N input fingerprints as received, the to-be-decrypted object being encrypted by using N preset fingerprints.

Figure 3:
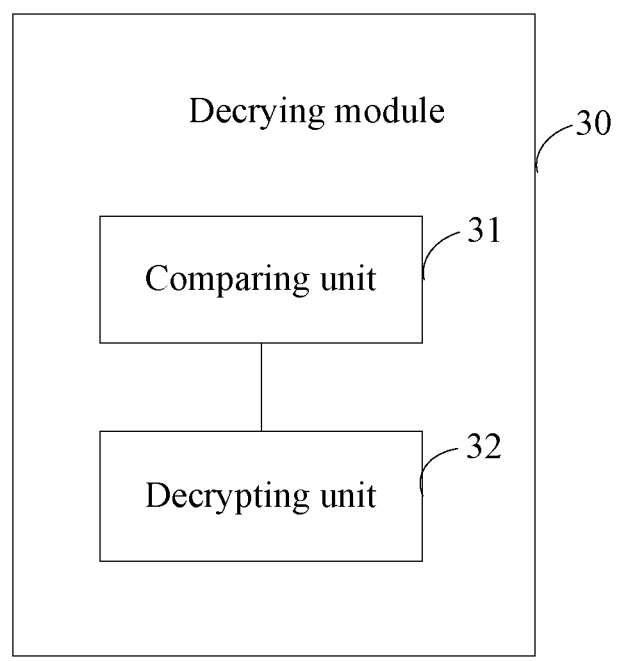
FIG. 3 is a structural diagram of a decryption module in the fingerprint decryption device according to the second embodiment of the present disclosure.

Further, as illustrated in FIG. 3, the decrypting module 30 includes:

a comparing unit 31, configured to compare the N input fingerprints as received with the N preset fingerprints; and a decrypting unit 32, configured to decrypt the to-be-decrypted object when the N input fingerprints as received respectively match with the N preset fingerprints.

The comparing unit 31 is specifically configured to successively compare the N input fingerprints as received with the N preset fingerprints in a one-by-one manner.

The decrypting unit 32 is specifically configured to decrypt the to-be-decrypted object when the N input fingerprints as received respectively match with the N preset fingerprints in accordance with a specific sequence.

In this embodiment, the N preset fingerprints are used to encrypt an object to obtain the to-be-decrypted object, and the to-be-decrypted object is stored. This embodiment of the present disclosure may be applicable to any scenario where encryption and decryption are needed, for example, unlocking of a mobile terminal, account login and payment, and switching of a working mode, an operating system, a wallpaper, a subject and the like of the mobile terminal. The to-be-decrypted object includes, but not limited to, a document, a file folder and an application.

Correspondingly, N input fingerprints are received when decryption is needed. The N input fingerprints may be different from each other, or partially or totally the same. Likewise, the N preset fingerprints may be different from each other, or partially or totally the same. For example, a fingerprint of a little finger of a right hand is input twice on the fingerprint sensor (N=2) to form two preset fingerprints, or a fingerprint of a thumb of a left hand and a fingerprint of a forefinger of a right hand may be input to form two preset fingerprints, or even fingerprints of two persons may be input to form two preset fingerprints, When the N preset fingerprints are different from each other, the to-be-decrypted object using the N preset fingerprints for encryption has a highest security level.

Further, a total input time duration and/or an input time interval of N fingerprints may be preset.

The total input time duration of the N fingerprints is set to be less than a first predetermined threshold. When a total input time duration of the input fingerprint combination, i.e., the N input fingerprints, is greater than the first predetermined threshold, it is determined that the input fingerprints do not belong to a single fingerprint input process (if the total input time duration exceeds 10 seconds, it is considered that a fingerprint input after the 10 seconds does not pertain to the input fingerprints for this decryption).

The input time interval of the N fingerprints is set to be less than or equal to a second predetermined threshold. When a time interval between two successive input fingerprints is greater than the second predetermined threshold, it is determined that the N input fingerprints do not belong to a single fingerprint input process, or it is determined that the input fingerprint combination input for decryption is different from a preset fingerprint combination for encryption.

In this embodiment of the present disclosure, the decrypting module 30 compares the input fingerprints for decryption with the preset fingerprints for encryption, and a matching standard between the input fingerprints for decryption and the preset fingerprints for encryption may be predefined. On the basis that the number of input fingerprints as received is the same as the number of the preset fingerprints, fingerprint matching is performed, wherein the fingerprint matching may employ a known algorithm, which is not described herein any further. The to-be-decrypted object is decrypted when the input N fingerprints as received respectively match with the N preset fingerprints.

In this embodiment of the present disclosure, when the N input fingerprints all successfully match (when other encryption information is included, the encryption information also needs to be compared), it is determined that the input fingerprint combination for decryption is consistent with the preset fingerprint combination for encryption. If the N preset fingerprints are partially or totally the same, the number of same fingerprints may be set, instead of setting the same fingerprints repeatedly.

Further, an input sequence of fingerprints may be defined corresponding to the N preset fingerprints. During decryption, the comparing unit 31 successively compares the N input fingerprints with N preset fingerprints in a one-by-one manner; and the decrypting unit 32 decrypts the to-be-decrypted object when the N input fingerprints as received respectively match with the N preset fingerprints in fingerprint characteristics and an input sequence of the N input fingerprints is also in accordance with a specific sequence of the N preset fingerprints. If the input sequence of fingerprints is strictly defined, with respect to the input fingerprint combination in which the N input fingerprints all successfully match with the N preset fingerprints, but with different input sequences, it is still determined that the input fingerprint combination is inconsistent with the preset fingerprint combination.

In this embodiment of the present disclosure, the to-be-decrypted object is decrypted by using an input fingerprint combination of two or more fingerprints, which improves the security of data or applications of the mobile terminal. In addition, due to uniqueness of the fingerprint, the user does not need to worry about interception or peeping by others during fingerprint input, and thus great convenience is brought to the user. Furthermore, the total input time duration, the input time interval and the input sequence of the fingerprint combination may be defined to further improve data security.

The device according to this embodiment may be applicable to all mobile terminals equipped with a fingerprint sensor. Since the tablet computers, smart phones and the like mobile terminals available in the market are all provided with a fingerprint sensor, fingerprint decryption may be practiced without increasing any cost for additional device.

The above descriptions are merely preferred embodiments of the present disclosure, but not intended to limit the present disclosure. Any modification, equivalent replacement, and improvement made without departing from the spirit and principle of the present disclosure shall fall within the protection scope of the present disclosure.

INDUSTRIAL PRACTICABILITY

In this embodiment of the present disclosure, the to-be-decrypted object is decrypted by using an input fingerprint combination of two or more fingerprints, which improves the security of data or applications of the mobile terminal. In addition, due to uniqueness of the fingerprint, the user does not need to worry about interception or peeping by others during fingerprint input, and thus great convenience is brought to the user. Since the tablet computers, smart phones and the like mobile terminals available in the market are all provided with a fingerprint sensor, fingerprint decryption may be practiced without increasing any cost for additional device.

What is claimed is:

1. A fingerprint decryption method, comprising:
    receiving N input fingerprints, N being an integer greater than or equal to 2;
    determining whether a total input time duration of the N input fingerprints is less than or equal to a first predetermined threshold;
    if the total input time duration of the N input fingerprints is greater than the first predetermined threshold, determining input fingerprints after the first predetermined threshold do not pertain to the current decryption and the current decryption is not successful; and
    if the total input time duration of the N input fingerprints is less than or equal to the first predetermined threshold, decrypting a to-be-decrypted object according to the N input fingerprints, wherein the to-be-decrypted object is encrypted by using N preset fingerprints;

wherein the N preset fingerprints are partially or totally same, the number of same preset fingerprints is set instead of setting the same preset fingerprints repeatedly; and wherein the N input fingerprints are partially or totally same.

2. The method according to claim 1, wherein an input time interval of the received N fingerprints is less than or equal to a second predetermined threshold.

3. The method according to claim 1, wherein the decrypting a to-be-decrypted object according to the N input fingerprints comprises:

comparing the N input fingerprints with the N preset fingerprints; and decrypting the to-be-decrypted object when the N input fingerprints respectively match with the N preset fingerprints.

4. The method according to claim 3, wherein the comparing the N input fingerprints with the N preset fingerprints comprises:

successively comparing the N input fingerprints with the N preset fingerprints in a one-by-one manner; and wherein the N input fingerprints respectively matching with the N input fingerprints specifically refers to:

the N input fingerprints respectively match with the N preset fingerprints and an input sequence of the N input fingerprints is also in accordance with a specific sequence of the N preset fingerprints.

5. A mobile terminal, comprising:

a fingerprint sensor, configured to receive N input fingerprints, N being an integer greater than or equal to 2; and a fingerprint decryption device coupled with the fingerprint sensor, configured to determine whether a total input time duration of the N input fingerprints is less than or equal to a first predetermined threshold; if the total input time duration of the N input fingerprints is greater than the first predetermined threshold, determine input fingerprints after the first predetermined threshold do not pertain to the current decryption and the current decryption is not successful; and if the total input time duration of the N input fingerprints is less than or equal to the first predetermined threshold decrypt a to-be-decrypted object according to the N input fingerprints, the to-be-decrypted object being encrypted by using the N preset fingerprints;

wherein the N preset fingerprints are partially or totally same, the number of same preset fingerprints is set instead of setting the same preset fingerprints repeatedly;

wherein the N input fingerprints are partially or totally same.

6. The mobile terminal according to claim 5, wherein an input time interval of the N input fingerprints is less than or equal to a second predetermined threshold.

7. The mobile terminal according to claim 5, wherein the fingerprint decryption device is configured to compare the N input fingerprints with the N preset fingerprints; and decrypt the to-be-decrypted object when the N input fingerprints respectively match with the N preset fingerprints.

8. The mobile terminal according to claim 7, wherein the fingerprint decryption device is configured to successively compare the N input fingerprints with the N preset fingerprints in a one-by-one manner; and wherein the N input fingerprints respectively matching with the N preset fingerprints specifically refers to: the N input fingerprints respectively match with the N preset fingerprints and an input sequence of the N input fingerprints is also in accordance with a specific sequence of the N preset fingerprints.

* * * * *